United States Patent
Mizuguchi et al.

(10) Patent No.: US 7,083,675 B2
(45) Date of Patent: *Aug. 1, 2006

(54) BLACK PERYLENE-BASED PIGMENT AND PROCESS FOR PRODUCING THE SAME

(75) Inventors: Jin Mizuguchi, Yokohama (JP); Nobuya Shimo, Ohtake (JP)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/762,579

(22) Filed: Jan. 23, 2004

(65) Prior Publication Data

US 2004/0255821 A1    Dec. 23, 2004

Related U.S. Application Data

(63) Continuation-in-part of application No. PCT/JP02/07603, filed on Jul. 26, 2002.

(30) Foreign Application Priority Data

Jul. 27, 2001    (JP) .............................. 2001-227693

(51) Int. Cl.
*C08K 5/00* (2006.01)
*C09B 5/62* (2006.01)
*C09B 67/20* (2006.01)
*C09B 67/22* (2006.01)

(52) U.S. Cl. ......................... 106/498; 106/493; 546/37

(58) Field of Classification Search ................ 106/498, 106/493; 546/37
See application file for complete search history.

(56) References Cited

U.S. PATENT DOCUMENTS

| | | | | |
|---|---|---|---|---|
| 3,554,776 A | * | 1/1971 | Gerson et al. | 106/494 |
| 4,450,273 A |   | 5/1984 | Graser | |
| 4,742,170 A | * | 5/1988 | Spietschka et al. | 546/37 |
| 4,769,460 A | * | 9/1988 | Spietschka et al. | 546/37 |
| 4,882,254 A | * | 11/1989 | Loutfy et al. | 430/58.8 |
| 5,154,770 A | * | 10/1992 | Spietschka et al. | 106/498 |
| 6,165,661 A | * | 12/2000 | Hsiao et al. | 430/58.8 |
| 6,322,941 B1 | * | 11/2001 | Hsiao et al. | 430/58.65 |
| 6,464,902 B1 | * | 10/2002 | Gaynor et al. | 252/600 |
| 2005/0016420 A1 | * | 1/2005 | Mizuguchi et al. | 106/493 |

FOREIGN PATENT DOCUMENTS

| | | |
|---|---|---|
| JP | 52-103450 | 8/1977 |
| JP | 57-139144 | 8/1982 |

* cited by examiner

*Primary Examiner*—Anthony J. Green
(74) *Attorney, Agent, or Firm*—Nixon & Vanderhye P.C.

(57) ABSTRACT

A black perylene-based pigment comprising a solid solution obtained by calcining a mixture of at least two compounds selected from the group consisting of anhydrides of perylene tetracarboxylic acid, diimide derivatives of perylene tetracarboxylic acid and diimide derivatives of perylene diiminodicarboxylic acid, exhibits an excellent blackness, an excellent heat resistance and an excellent weather fastness as well as a high resistance and a high safety.

4 Claims, 2 Drawing Sheets

BLACK PERYLENE-BASED PIGMENT AND PROCESS FOR PRODUCING THE SAME

This application is a continuation-in-part of PCT International Application No. PCT/JP02/07603 filed 26 Jul. 2002. PCT/JP02/107603 claims priority to JP Application No. 2001-227693 filed 27 Jul. 2001. The entire contents of these applications are incorporated herein by reference.

TECHNICAL FIELD

The present invention relates to a black perylene-based pigment and a process for producing the same, and more particularly, to a black perylene-based pigment having a high blackness, a high tinctorial strength, an excellent heat resistance and an excellent weather fastness as well as a high safety and a high electrical resistance, and a process for producing such a black perylene-based pigment. The black perylene-based pigment of the present invention is useful as coloring pigments for inks, paints, ink-jet printing inks, electrophotographic toners, rubbers and plastics, black matrix pigments for liquid crystal color filters, etc.

BACKGROUND ART

As black pigments, there have been conventionally used carbon black, perylene-based pigments and the like. Among these black pigments, carbon black has been most widely used because of its high tinctorial strength as well as an excellent blackness, an excellent acid resistance and an excellent weather fastness. However, carbon black has a very small particle size and a large bulk density and, therefore, tends to suffer from problems such as poor handling property and workability. Also, it may be difficult to use such carbon black in applications requiring a high electrical resistance, such as black matrix materials for liquid crystal color filters, because of a low electrical resistance thereof. Further, the carbon black may contain carcinogenic polycyclic condensation compounds and, therefore, has a problem concerning a safety.

Although the perylene-based pigments extensively used as fast pigments exhibit red-violet-brown-black colors in a solid state, the color tone thereof is not necessarily kept thermally stable (W. Herbst & K. Hunger "Industrial Organic Pigments", VCH Press, pp. 467–480).

In order to improve the thermally unstable color tone of the perylene-based pigments, there have been proposed solid solution (mixed crystal) pigments composed of two diimide derivatives of perylene tetracarboxylic acid (Japanese Patent Application Laid-Open (KOKAI) Nos. 52-103450 and 57-139144 and Japanese Patent Publication (KOKOKU) No. 45-33552). However, these conventional black perylene-based pigments are deteriorated in blackness in spite of the high tinctorial strength thereof, so that there may be arise such a problem that the color tone thereof is readily changed when applying a mechanical shear force thereto. In the process described in Japanese Patent Publication (KOKOKU) No. 45-33552, the mixed crystal pigment is produced by dissolving raw compounds as a mixed crystal component in a solvent and then adding acids, etc. to the resultant solution, thereby precipitating the mixed crystal pigment.

An object of the present invention is to provide a black perylene-based pigment exhibiting an excellent blackness, an excellent heat resistance and an excellent weather fastness as well as a high safety, which is usable as black matrix pigments for liquid crystal color filters.

DISCLOSURE OF THE INVENTION

Figure 1:
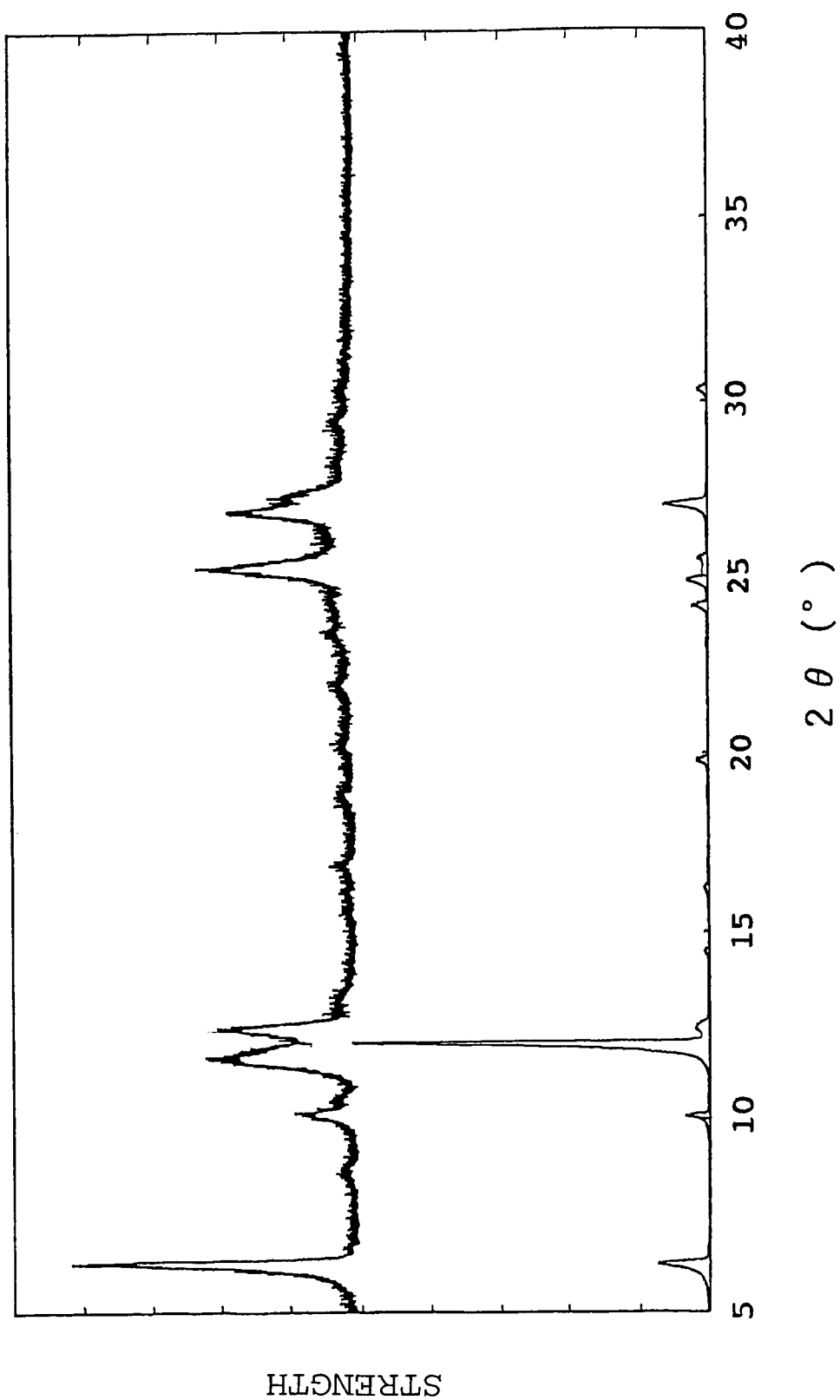
FIG. 1 is a graph showing X-ray diffraction diagram of the black pigment obtained in Example 1 and the pigment obtained in Comparative Example 2.

The above object of the present invention can be accomplished by a solid solution (black perylene-based pigment) obtained by using calcining techniques which have not been conventionally used in the application field of organic pigments, more specifically by calcining a specific perylene-based pigment at a specific temperature.

In an aspect of the present invention, there is provided a black perylene-based pigment comprising a solid solution composed of at least two compounds selected from the group consisting of compounds represented by the following formulae (I) to (IV):

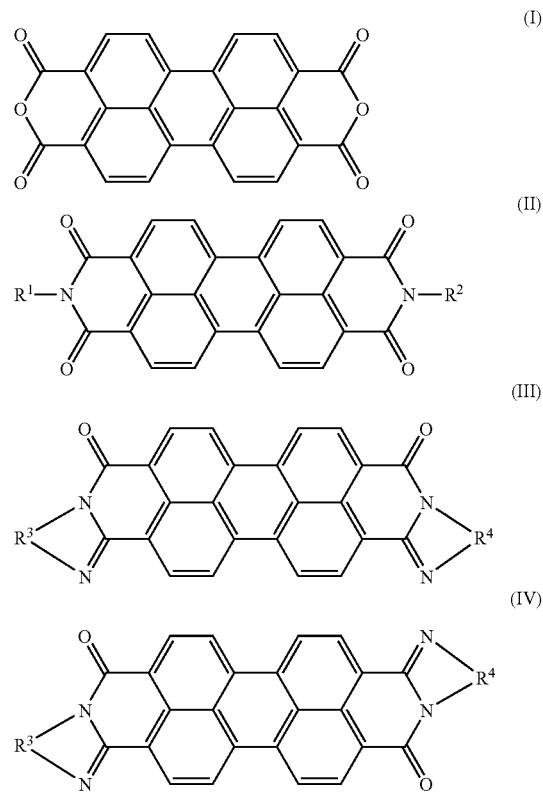

wherein $R^1$ and $R^2$ may be same or different and are independently —$(CH_2)_n$—X, wherein X is hydrogen atom, methyl group, alkoxy group, hydroxy group, phenyl group, 4'-(azophenyl)phenyl group, alkylphenyl group, alkoxyphenyl group, phenol group, halogenated phenyl group, pyridyl group, alkylpyridyl group, alkoxypyridyl group, halogenated pyridyl group, pyridylvinyl group and 1-naphthyl group, and n is an integer of 0 to 5; and $R^3$ and $R^4$ may be same or different and are independently phenylene group, alkylphenylene group, alkoxyphenylene group, hydroxyphenylene group, halogenated phenylene group, pyridinediyl group, alkylpyridinediyl group, alkoxypyridinediyl group, halogenated pyridinediyl group and naphthalenediyl group, the said $R^3$ and $R^4$ being bonded to adjacent positions of the aromatic ring, respectively.

In another aspect of the present invention, there is provided a process for producing a black perylene-based pigment, which comprises the step of calcining a mixture containing at least two compounds selected from the group consisting of the compounds represented by the above formulae (I) to (IV) at a temperature of 100 to 600° C. in vacuum or in an inert gas atmosphere.

The present invention is described in detail below. The black perylene-based pigment of the present invention comprises a solid solution (mixed crystal) of at least two compounds selected from the group consisting of the compounds represented by the formulae (I) to (IV). The formation of the solid solution is confirmed by observing a new diffraction diagram different from that of a simple mixture of raw materials, wherein some of the diffraction peaks of the mixture disappear and new diffraction peak(s) appear upon X-ray diffraction analysis.

Examples of the preferred $R^1$ and $R^2$ groups in the compounds represented by the formula (II) may include hydrogen atom, methyl group, ethyl group, butyl group, methoxy group, ethoxy group, hydroxy group, phenyl group, phenylethyl group, 3-methoxyphenyl group, 4-methoxyphenyl group, 4-ethoxyphenyl group, 4-ethoxyphenylmethyl group, benzyl group, 2,4-dimethylphenyl group, 2,6-dimethylphenyl group, 3,5-dimethylphenyl group, 2,4-dimethoxyphenyl group, 2,6-dimethoxyphenyl group, 2-chlorophenyl group, 3-chlorophenyl group, 4-chlorophenyl group, 2-bromophenyl group, 3-bromophenyl group, 4-bromophenyl group, 2-fluorophenyl group, 3-fluorophenyl group, 4-fluorophenyl group, 4'-(azophenyl)phenyl group, 2-pyridyl group, 3-pyridyl group, 4-pyridyl group, 6-methyl-2-pyridyl group, 5-methyl-3-pyridyl group, 5-methyl-2-pyridyl group, 5-methoxy-3-pyridyl group, 5-chloro-3-pyridyl group, pyridylvinyl group and 1-naphthyl group.

Among these $R^1$ and $R^2$ groups, more preferred are butyl group, phenylethyl group, 4-methoxyphenylmethyl group and pyridyl group.

Examples of the preferred $R^3$ and $R^4$ groups in the compounds represented by the formulae (III) and (IV) may include phenylene group, 3-methxoyphenylene group, 4-methoxyphenylene group, 4-ethoxyphenylene group, $C_1$ to $C_3$ alkylphenylene group, hydroxyphenylene group, 4,6-dimethylphenylene group, 3,5-dimethylphenylene group, 3-chlorophenylene group, 4-chlorophenylene group, 5-chlorophenylene group, 3-bromophenylene group, 4-bromophenylene group, 5-bromophenylene group, 3-fluorophenylene group, 4-fluorophenylene group, 5-fluorophenylene group, 2,3-pyridinediyl group, 3,4-pyridinediyl group, 4-methyl-2,3-pyridinediyl group, 5-methyl-2,3-pyridinediyl group, 6-methyl-2,3-pyridinediyl group, 5-methyl-3,4-pyridinediyl group, 4-methoxy-2,3-pyridinediyl group, 4-chloro-2,3-pyridinediyl group and naphthalenediyl group.

Among these $R^3$ and $R^4$ groups, more preferred are phenylene group and 3,4-pyridinediyl group.

The mixing ratio (mol %) of the at least two compounds selected from the group consisting of those compounds represented by the formulae (I) to (IV) is usually 5 to 90:95 to 10, preferably 15 to 80:85 to 20.

Also, as the black perylene-based pigment, preferred are pigments comprising a solid solution composed of at least one compound (A) selected from the group consisting of those compounds represented by the formulae (I) and (II) and at least one compound (B) selected from the group consisting of those compounds represented by the formulae (III) and (IV).

The content of the compound (A) in the solid solution is usually 5 to 90 mol %, preferably 15 to 80 mol %, more preferably 20 to 70 mol %. When the content of the compound (A) is less than 5 mol %, the obtained pigments may have a relatively low light absorption at a visible light wavelength of not more than 500 nm, so that it tends to be difficult to obtain pigments having a sufficient blackness. When the content of the compound (A) is more than 90 mol %, the obtained pigments may have a relatively low light absorption at a visible light wavelength of not less than 600 nm, so that it also tends to be difficult to obtain pigments having a sufficient blackness.

The content of the compound (B) in the solid solution is usually 95 to 10 mol %, preferably 85 to 20 mol %, more preferably 80 to 30 mol %. When the content of the compound (B) is less than 10 mol %, the obtained pigments may have a relatively low light absorption at a visible light wavelength of not less than 600 nm, so that it tends to be difficult to obtain pigments having a sufficient blackness. When the content of the compound (B) is more than 95 mol %, the obtained pigments may have a relatively low light absorption at a visible light wavelength of not more than 500 nm, so that it also tends to be difficult to obtain pigments having a sufficient blackness.

Next, the process for producing the black perylene-based pigment according to the present invention is described below. According to the process of the present invention, at least two compounds selected from the group consisting of the compounds represented by the formulae (I) to (IV) are mixed with each other at a mixing ratio of usually 5 to 90:95 to 10 (mol %), and then the resultant mixture is calcined in vacuum or in an inert gas atmosphere at a temperature of usually 100 to 600° C., preferably 450 to 550° C. for usually 0.5 to 2 hours, preferably 1 to 2 hours, thereby obtaining a solid solution (mixed crystal). As the inert gas, there may be used helium, argon or the like. The resultant solid solution is subjected to ordinary finishing treatments such as milling, etc., thereby obtaining fine perylene-based pigment.

As described above, since the fine perylene-based pigment is produced by mixing at least two kinds of perylene derivatives having different chromophores with each other and then calcining the resultant mixture, the obtained pigment is in the form of a solid solution (mixed crystal) in which at least two kinds of molecular structures are uniformly distributed, and can show a uniform and large absorption over a visible light wavelength region.

The thus obtained black perylene-based pigment exhibits an excellent blackness, an excellent heat resistance and an excellent weather fastness as well as a high electrical resistance and a high safety and, therefore, is useful as coloring pigments for inks, paints, ink-jet printing inks, electrophotographic toners, rubbers and plastics, and pigments for black matrix materials.

BEST MODE FOR CARRYING OUT THE INVENTION

The present invention is described in more detail by Examples and Comparative Examples, but the Examples are only illustrative and, therefore, not intended to limit the scope of the present invention.

(1) Confirmation of Formation of Solid Solution (Mixed Crystal):

The X-ray diffraction pattern of the black perylene-based pigment was measured by Cu-Kα ray using an X-ray diffractometer "RINT2000" (manufactured by RIGAKU DENKI CO., LTD.). The X-ray diffraction pattern of the solid solution (mixed crystal) was such a pattern, in which a new diffraction curve different from that of a simple mixture of raw materials (which was obtained as a sum of diffraction curves of respective components) was observed, wherein in the new diffraction diagram, some of the diffraction peaks of the respective components disappeared and new diffraction peak(s) appeared.

Figure 2:
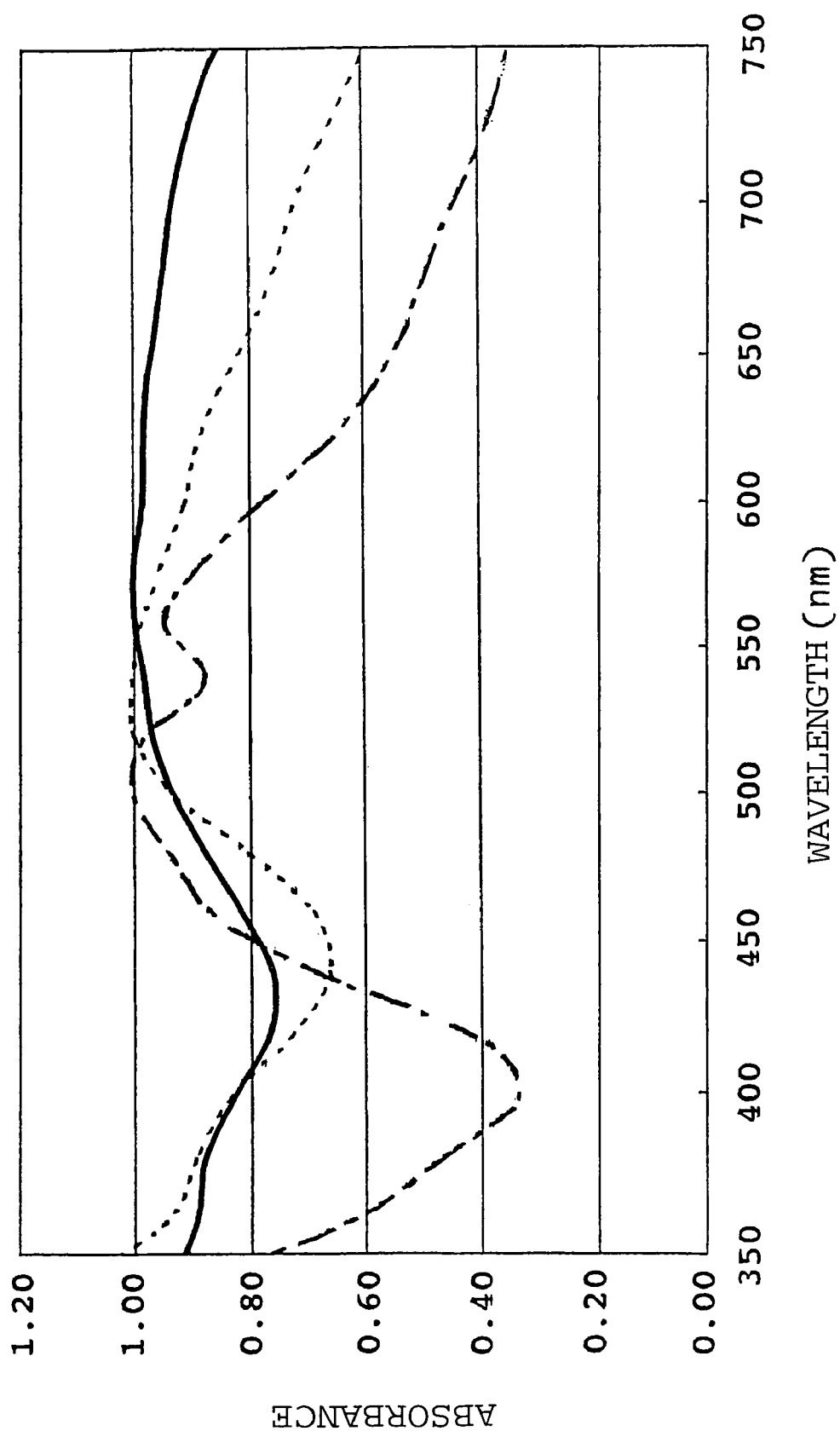
FIG. 2 is a graph showing light absorption spectrums of the black pigment obtained in Example 1 and the pigment obtained in Comparative Example 2.

(2) Blackness:

The blackness of the black perylene-based pigment was expressed by the ratio of a minimum value to a maximum value of an absorption band in a visible light region (refer to FIG. 2). When the ratio is not less than 0.55, the obtained black pigments showed a high blackness. The ratio of the minimum value to the maximum value of the absorption band is preferably not less than 0.65, more preferably not less than 0.75. The visible light absorption spectrum of a test specimen was measured by a spectrophotometer "UV-2400PC" (manufactured by SHIMADZU SEISAKUSHO CO., LTD.), thereby obtaining the minimum value and the maximum value of absorption band thereof. Meanwhile, the test specimen used for the measurement of the visible light absorption spectrum was prepared as follows. That is, 0.1 g of the black perylene-based pigment and 0.5 ml of castor oil were mixed together by a Hoover's muller to form a paste. 4.5 g of clear lacquer was added to the obtained paste and was intimately kneaded to form a paint. The obtained paint was applied on an OHP sheet by using a 1-mil applicator to form a coating film thereon.

(3) Tinctorial Strength:

The tinctorial strength, the weather fastness and the heat resistance of the black perylene-based pigment were evaluated by using L*, a* and b* values according to CIE space, i.e., uniform sensory color space of Commission Internationale de l'Eclairage (1976). The tinctorial strength was determined as follows. That is, the L* value of a specimen was measured by using a spectrocolorimeter "Color Guide" (manufactured by BYK-Gardner GmbH), and the visual reflectivity Y (%) was calculated from the measured L* value according to the following formula:

$Y(\%) = L^{*2}/100$

Further, the Munsell value was obtained from the thus calculated visual reflectivity Y value by referring to Attached Table-2 of JIS-Z-8721.

The tinctorial strength (TS (%)) of a test specimen was calculated from the Munsell value (VA) of a control specimen and the Munsell value (VB) of the test specimen according to the following formula:

$TS(\%) = \{1-(VB-VA)\} \times 100$

The test specimen was prepared as follows. That is, 0.5 g of the black perylene-based pigment, 1.5 g of titanium dioxide and 0.5 ml of castor oil were mixed together by a Hoover's muller to form a paste. 4.5 g of clear lacquer was added to the obtained paste and was intimately kneaded to form a paint. The obtained paint was applied on a cast-coated paper by using a 6-mil applicator, thereby obtaining a coating film thereon. The control specimen was prepared as follows. That is, 0.5 g of the black perylene-based pigment obtained in Comparative Example 1, 1.5 g of titanium dioxide and 0.5 ml of castor oil were mixed together by a Hoover's muller to form a paste. 4.5 g of clear lacquer was added to the obtained paste and was intimately kneaded to form a paint. The obtained paint was applied on a cast-coated paper by using a 6-mil applicator, thereby obtaining a coating film thereon.

(4) Weather Fastness:

The black perylene-based pigment particles were placed about 10 cm underneath an extra-high pressure mercury lamp (500W, manufactured by USHIO DENKI CO., LTD.) and irradiated with light therefrom for 8 hours. The thus irradiate-treated black perylene-based pigment particles as well as non-irradiate-treated black perylene-based pigment particles were used to prepare each of test specimens by the below-mentioned method. The L*, a* and b* values of the test specimens were measured, and the weather fastness of the black perylene-based pigment was expressed by the color difference (ΔE) calculated from the measured L*, a* and b* values according to the following formula:

$$\Delta E = \sqrt{(L_s^* - L^*)^2 + (a_s^* - a^*)^2 + (b_s^* - b^*)^2}$$

wherein $L_s^*$, $a_s^*$ and $b_s^*$ represent hue values of the non-treated black perylene-based pigment; and L*, a* and b* represent hue values of the treated black perylene-based pigment.

When the color difference (ΔE) is not more than 0.3, the obtained black perylene-based pigment was free from change in hue between before and after the treatment and, therefore, had an excellent weather fastness.

The test specimens were prepared as follows. That is, 0.5 g of the black perylene-based pigment and 0.5 ml of castor oil were mixed together by a Hoover's muller to form a paste. 4.5 g of clear lacquer was added to the obtained paste and was intimately kneaded to form a paint. The obtained paint was applied on a cast-coated paper by using a 6-mil applicator, thereby obtaining a coating film thereon.

(5) Heat Resistance:

The heat resistance of the black perylene-based pigment was measured as follows. That is, the hue values of the black perylene-based pigment heat-treated in an oven at 200° C. for one hour as well as those of the non-heat-treated black perylene-based pigment were respectively measured, and the heat resistance of the black perylene-based pigment was expressed by the color difference (ΔE) by the same method as used in the above evaluation of the weather fastness.

(6) Electrical Resistance:

The electrical resistance of the black perylene-based pigment was expressed by the volume resistivity value thereof as measured by the following method. First, 0.5 g of the black perylene-based pigment was weighed and then molded under a pressure of 140 kg/cm² to form a test specimen. The thus prepared test specimen was set between a pair of stainless steel electrodes completely isolated from outside by a Teflon holder. The test specimen was applied with a voltage of 15 V by using a Wheastone bridge ("TYPE 2768" manufactured by Yokogawa Denki Co., Ltd.) to measure a resistance value R thereof. After the measurement, an electrode area A (cm$^2$) and a thickness t (cm) of the test specimen were measured, and the volume resistivity value X (Ω·cm) thereof was calculated from the measured values according to the following formula:

$$X=R/(A/t)$$

EXAMPLE 1

120.1 g (0.2 mol) of a compound represented by the formula (II) wherein $R^1$ and $R^2$ both are —CH$_2$—CH$_2$—C$_5$H$_4$N (where X is pyridyl group and n is 2), and 107.3 g (0.2 mol) of a compound represented by the formula (III) wherein $R^3$ and $R^4$ both are phenylene group, were mixed together by a mortar, and then heat-treated at 500° C. for one hour in an argon gas atmosphere in a cylindrical heating furnace. The resultant product was pulverized by a ball mill, thereby obtaining a black pigment.

As a result of measuring the X-ray diffraction diagram of the obtained black pigment, as shown in FIG. 1, there was observed the diffraction diagram (as shown in an upper part of FIG. 1) which was different from the diffraction diagram (as shown in a lower part of FIG. 1) of a simple mixture of the starting materials (Comparative Example 2). Therefore, it was conformed that the obtained product had a new solid solution crystal structure. Also, as a result of measuring the light absorption spectrum of the obtained black pigment, as shown in FIG. 2, there was observed the absorption spectrum (indicated by the solid line in FIG. 2) exhibiting a broad absorption band covering a whole visible light region, which was different from the absorption spectra of the respective starting materials used in the form of a simple mixture (Comparative Example 2; spectrum indicated by the dotted line for the compound represented by the formula (II) wherein $R^1$ and $R^2$ both are —CH$_2$—CH$_2$—C$_5$H$_4$N, and spectrum indicated by the alternate long and short dash line for the compound represented by the formula (III) wherein $R^3$ and $R^4$ both are phenylene group).

Further, when the obtained black pigment was heat-treated at 200° C. for one hour, no change in quality thereof was caused. Also, when the black pigment was irradiated with light for 8 hours using an ultra-high pressure mercury lamp, no change in hue thereof between before and after the irradiation was observed. As a result, it was confirmed that the black pigment had an excellent heat resistance and an excellent weather fastness. Essential production conditions are shown in Table 1, and various properties of the obtained black pigment are shown in Table 2.

EXAMPLES 2 TO 5

The same procedure as defined in Example 1 was conducted except that the amounts of the compounds represented by the formulae (II) and (III) were changed variously, thereby producing black pigments. Essential production conditions are shown in Table 1, and various properties of the obtained black pigments are shown in Table 2. Also, as a result of measuring the X-ray diffraction diagram of the obtained black pigments, there were observed the diffraction diagram different from that of a simple mixture of the starting materials. Therefore, it was confirmed that the obtained black pigments had a new solid solution crystal structure.

EXAMPLE 6

The same procedure as defined in Example 1 was conducted except that the compound represented by the formula (II) was replaced with 78.4 g (0.2 mol) of perylene tetracarboxylic dianhydride as the compound represented by the formula (I), thereby producing a black pigment. Essential production conditions are shown in Table 1, and various properties of the obtained black pigment are shown in Table 2. Also, as a result of measuring the X-ray diffraction diagram of the obtained black pigment, there was observed the diffraction diagram different from that of a simple mixture of the starting materials. Therefore, it was confirmed that the obtained black pigment had a new solid solution crystal structure.

EXAMPLE 7

The same procedure as defined in Example 1 was conducted except that the compound represented by the formula (III) was replaced with 107.7 g (0.2 mol) of the compound represented by the formula (IV) wherein $R^3$ and $R^4$ both are pyridyl group, thereby producing a black pigment. Essential production conditions are shown in Table 1, and various properties of the obtained black pigment are shown in Table 2. Also, as a result of measuring the X-ray diffraction diagram of the obtained black pigment, there was observed the diffraction diagram different from that of a simple mixture of the starting materials. Therefore, it was confirmed that the obtained black pigment had a new solid solution crystal structure.

EXAMPLE 8

The same procedure as defined in Example 1 was conducted except that the compound represented by the formula (II) was replaced with 107.7 g (0.2 mol) of the compound represented by the formula (IV) wherein $R^3$ and $R^4$ both are pyridinediyl group, thereby producing a black pigment. Essential production conditions are shown in Table 1, and various properties of the obtained black pigment are shown in Table 2. Also, as a result of measuring the X-ray diffraction diagram of the obtained black pigment, there was observed the diffraction diagram different from that of a simple mixture of the starting materials. Therefore, it was confirmed that the obtained black pigment had a new solid solution crystal structure.

EXAMPLE 9

The same procedure as defined in Example 1 was conducted except that 78.1 g (0.2 mol) of a compound represented by the formula (II), wherein $R^1$ and $R^2$ both are hydrogen atom (where X is hydrogen atom and n is 0), and 107.3 g (0.2 mol) of the compound represented by the formula (III) wherein $R^3$ and $R^4$ both are phenylene group, were used, thereby producing a black pigment. Essential production conditions are shown in Table 1, and various properties of the obtained black pigment are shown in Table 2. Also, as a result of measuring the X-ray diffraction diagram of the obtained black pigment, there was observed the diffraction diagram different from that of a simple mixture of the starting materials. Therefore, it was confirmed that the obtained black pigment had a new solid solution crystal structure.

COMPARATIVE EXAMPLE 1

The visible light absorption spectrum of the compound represented by the formula (II) wherein $R^1$ and $R^2$ both are —$CH_2$—$CH_2$—$C_6H_5$ (where X is phenyl group and n is 2) was measured. As a result, it was confirmed that the absorption spectrum at a wavelength of not less than 650 nm and near 520 nm in visible light region was relatively small and, therefore, the compound was deteriorated in blackness (spectrum indicated by the dotted line in FIG. 2). Various properties of the pigment are shown in Table 2.

COMPARATIVE EXAMPLE 2

120.1 g (0.2 mol) of a compound represented by the formula (II) wherein $R^1$ and $R^2$ both are —$CH_2$—$CH_2$—$C_5H_4N$ (where X is pyridyl group and n is 2) and 107.3 g (0.2 mol) of a compound represented by the formula (III) wherein $R^3$ and $R^4$ both are phenylene group, were mixed together by a mortar, thereby obtaining a pigment. The X-ray diffraction diagram of the obtained pigment was measured. From the measured diffraction diagram (as shown in a lower part of FIG. 1), it was confirmed that the obtained pigment is a simple mixture of these compounds. Also, as a result of measuring the light absorption spectrum of the obtained pigment, there was observed the absorption spectrum identical to that of the pigment used as the starting materials, that is, the absorption spectrum at a wavelength of not less than 650 nm and near 520 nm was relatively small. Therefore, the obtained pigment was deteriorated in blackness (spectrums as indicated by the dotted line in FIG. 2, and alternate long and short dash line in FIG. 2). Further, when the obtained black pigment was irradiated with light using an ultra-high pressure mercury lamp for 8 hours and then heat-treated at 200° C. for one hour, the change in hue thereof was caused. As a result, it was confirmed that the black pigment was deteriorated in a weather fastness and a heat resistance. Various properties of the obtained pigment are shown in Table 2.

TABLE 1

| Examples and Comparative Examples | Compound(s) of formula(e) (I) and/or (II) | | Compound(s) of formula(e) (III) and/or (IV) | |
|---|---|---|---|---|
| | $R^1$ and $R^2$ | Mol % | $R^3$ and $R^4$ | Mol % |
| Example 1 | —$CH_2 \cdot CH_2$—$C_5H_4N$ | 50 | Phenylene group | 50 |
| Example 2 | —$CH_2 \cdot CH_2$—$C_5H_4N$ | 5 | Phenylene group | 95 |
| Example 3 | —$CH_2 \cdot CH_2$—$C_5H_4N$ | 25 | Phenylene group | 75 |
| Example 4 | —$CH_2 \cdot CH_2$—$C_5H_4N$ | 75 | Phenylene group | 25 |
| Example 5 | —$CH_2 \cdot CH_2$—$C_5H_4N$ | 90 | Phenylene group | 10 |
| Example 6 | —$CH_2 \cdot CH_2$—$C_5H_4N$ | 50 | Phenylene group | 50 |
| Example 7 | —$CH_2 \cdot CH_2$—$C_5H_4N$ | 50 | Pyridyl group | 50 |
| Example 8 | — | — | Formula (III): phenylene group | 50 |
| | | | Formula (IV): pyridinediyl group | 50 |
| Example 9 | H | 50 | Phenylene group | 50 |
| Comparative Example 1 | —$CH_2 \cdot CH_2$—$C_6H_5$ | 100 | — | — |
| Comparative Example 2 | —$CH_2 \cdot CH_2$—$C_5H_4N$ | 50 | Phenylene group | 50 |

TABLE 1-continued

| Examples and Comparative Examples | Preparation conditions Calcining conditions | |
|---|---|---|
| | Temperature (° C.) | Atmosphere |
| Example 1 | 500 | Argon |
| Example 2 | 500 | Argon |
| Example 3 | 500 | Argon |
| Example 4 | 500 | Argon |
| Example 5 | 500 | Argon |
| Example 6 | 500 | Argon |
| Example 7 | 500 | Argon |
| Example 8 | 500 | Argon |
| Example 9 | 500 | Argon |
| Comparative Example 1 | — | — |
| Comparative Example 2 | — | — |

TABLE 2

| Examples and Comparative Examples | Properties of pigment | | |
|---|---|---|---|
| | Blackness ($OD_{min}/OD_{max}$) | Tinctorial strength (%) | Volume resistivity value ($\Omega \cdot cm$) |
| Example 1 | 0.77 | 111 | $10^{11}$ |
| Example 2 | 0.75 | 113 | $10^{11}$ |
| Example 3 | 0.77 | 113 | $10^{11}$ |
| Example 4 | 0.77 | 111 | $10^{11}$ |
| Example 5 | 0.75 | 110 | $10^{11}$ |
| Example 6 | 0.77 | 111 | $10^{11}$ |
| Example 7 | 0.77 | 112 | $10^{11}$ |
| Example 8 | 0.72 | 110 | $10^{11}$ |
| Example 9 | 0.77 | 111 | $10^{11}$ |
| Comparative Example 1 | 0.48 | 100 | $10^{11}$ |
| Comparative Example 2 | 0.58 | 103 | $10^{11}$ |

| Examples and Comparative Examples | Properties of pigment | |
|---|---|---|
| | Weather fastness ($\Delta E$) | Heat resistance ($\Delta E$) |
| Example 1 | <0.3 | <0.3 |
| Example 2 | <0.3 | <0.3 |
| Example 3 | <0.3 | <0.3 |
| Example 4 | <0.3 | <0.3 |
| Example 5 | <0.3 | <0.3 |
| Example 6 | <0.3 | <0.3 |
| Example 7 | <0.3 | <0.3 |
| Example 8 | <0.3 | <0.3 |
| Example 9 | <0.3 | <0.3 |
| Comparative Example 1 | 1.5 | 2.1 |
| Comparative Example 2 | 1.3 | 1.8 |

INDUSTRIAL APPLICABILITY

As described above, the black perylene-based pigment according to the present invention is a solid solution (mixed crystal) pigment composed of at least two kinds of molecular structures uniformly distributed therein, and having a uniform and large light absorption in a visible light wavelength region, which solid solution exhibits an excellent blackness, an excellent heat resistance, an excellent weather fastness, a high electrical resistance and a high safety.

Therefore, the black perylene-based pigment is useful as pigments for inks, paints, ink-jet printing inks, electrophotographic toners, rubbers and plastics as well as black matrix materials.

Also, the black perylene-based pigment of the present invention are extremely thermally stable, and are free from change in color tone thereof. In addition, since the black perylene-based pigment shows no absorption band in near-infrared and infrared regions, a coating film containing such a black perylene-based pigment has an extremely high reflectivity in near-infrared and infrared regions. In particular, a polyvinyl chloride- or polyethylene-based coating film containing the black perylene-based pigment is inhibited from suffering from temperature rise even when exposed to sunshine irradiation, resulting in prolonged life of the coating film.

What is claimed is:

1. A black perylene-based pigment comprising a solid solution composed of at least two compounds selected from the group consisting of compounds represented by the following formulae (I) to (IV):

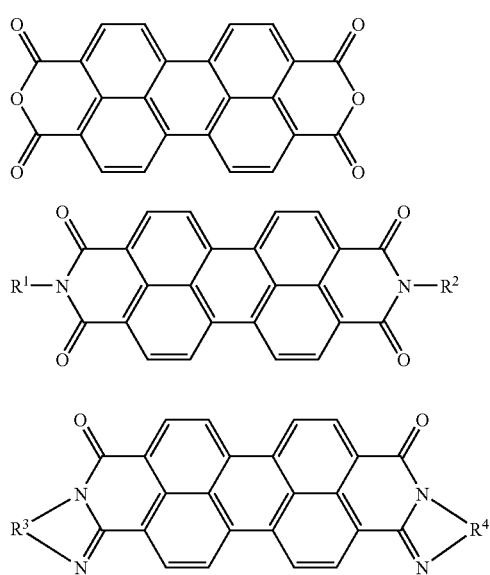

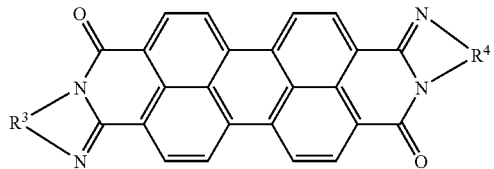

wherein $R^1$ and $R^2$ may be same or different and are independently —$(CH_2)_n$—X, wherein X is hydrogen atom, methyl group, alkoxy group, hydroxy group, phenyl group, 4'-(azophenyl)phenyl group, alkylphenyl group, alkoxyphenyl group, phenol group, halogenated phenyl group, pyridyl group, alkylpyridyl group, alkoxypyridyl group, halogenated pyridyl group, pyridylvinyl group and 1-naphthyl group, and n is an integer of 0 to 5; and $R^3$ and $R^4$ may be same or different and are independently phenylene group, alkylphenylene group, alkoxyphenylene group, hydroxyphenylene group, halogenated phenylene group, pyridinediyl group, alkylpyridinediyl group, alkoxypyridinediyl group, halogenated pyridinediyl group and naphthalenediyl group, said $R^3$ and $R^4$ being respectively bonded to adjacent positions of an aromatic ring of $R^3$ and $R^4$ to the respective nitrogen atoms.

2. A black perylene-based pigment according to claim 1, wherein the solid solution comprises at least one compound (A) selected from the group consisting of the compounds represented by the formulae (I) and (II), and at least one compound (B) selected from the group consisting of the compounds represented by the formulae (III) and (IV).

3. A black perylene-based pigment according to claim 2, wherein the amount of the compound (A) is 5 to 90 mol % and the amount of the compound (B) is 95 to 10 mol %.

4. A process for producing a black perylene-based pigment as defined in claim 1, comprising:
calcining a mixture composed of at least two compounds selected from the group consisting of the compounds represented by the formulae (I) to (IV) at a temperature of 100 to 600° C. in vacuum or in an inert gas atmosphere.

* * * * *